United States Patent [19]

Fuhs

[11] Patent Number: 4,901,261
[45] Date of Patent: Feb. 13, 1990

[54] RETRACTABLE HANDLE AND LATCH FOR PORTABLE COMPUTERS

[75] Inventor: Eric D. Fuhs, Stevensville, Mich.

[73] Assignee: Zenith Electronics Corporation, Glenview, Ill.

[21] Appl. No.: 265,110

[22] Filed: Oct. 31, 1988

[51] Int. Cl.⁴ .............................................. G06F 1/00
[52] U.S. Cl. .................................................... 364/708
[58] Field of Search ................. 364/708; 361/393–396

[56] References Cited

U.S. PATENT DOCUMENTS

| 4,497,036 | 1/1985 | Dunn | 364/708 |
| 4,571,456 | 2/1986 | Paulsen et al. | 364/708 X |
| 4,730,364 | 3/1988 | Tat-Kee | 364/708 X |
| 4,742,478 | 5/1988 | Nigro, Jr. et al. | 364/708 |

Primary Examiner—Gary V. Harkcom
Assistant Examiner—Tan V. Mai

[57] ABSTRACT

A portable computer with a retractable handle and lid latch, where extension of the handle actuates the latch and the handle retracts automatically as the lid is opened.

22 Claims, 7 Drawing Sheets

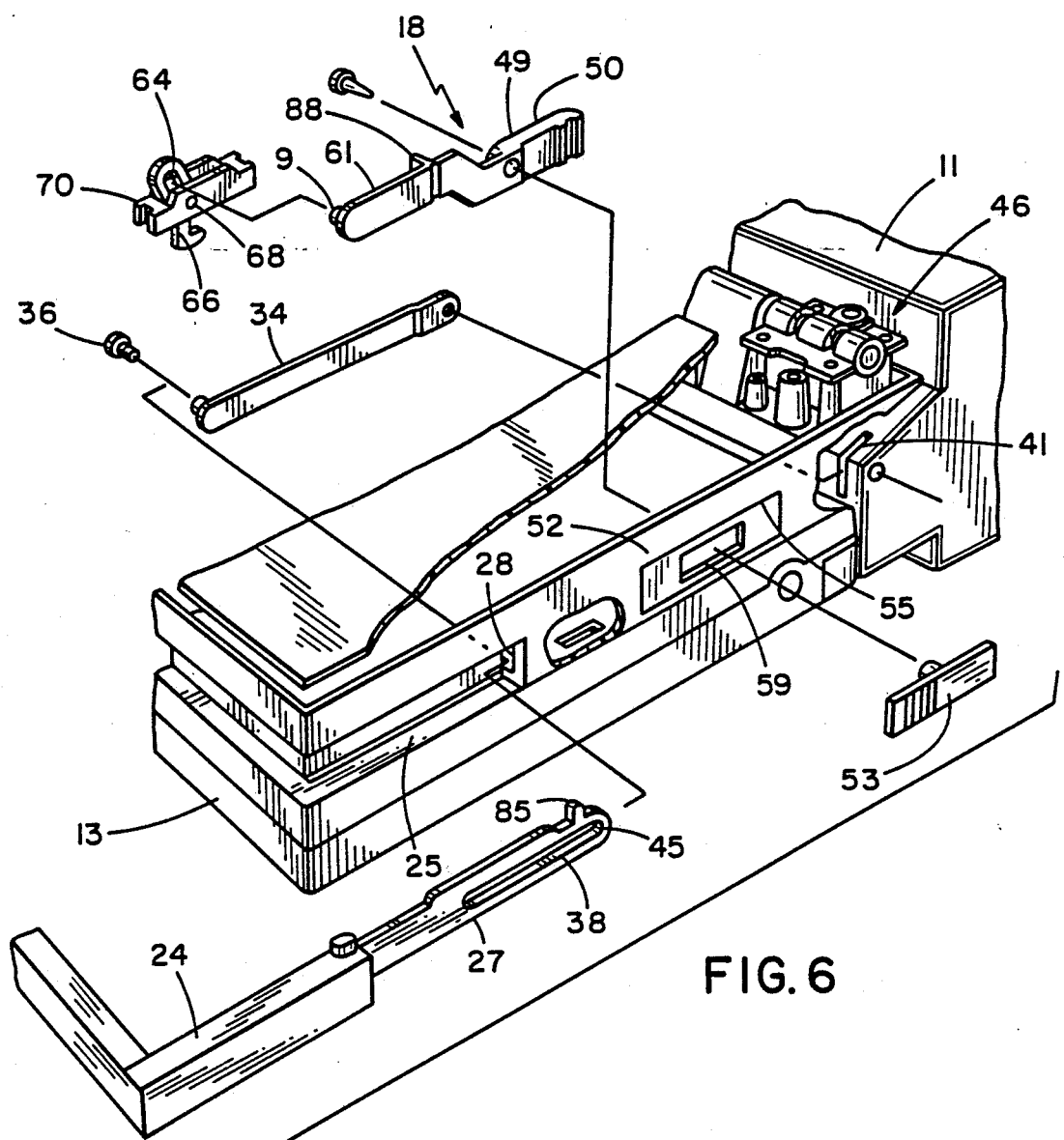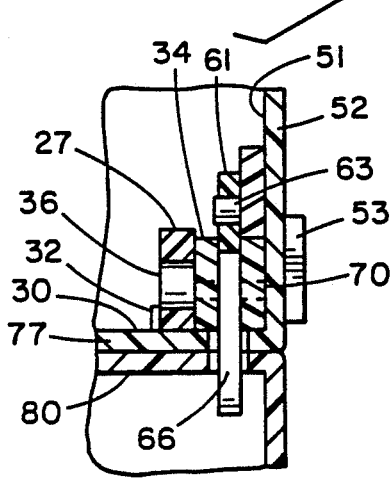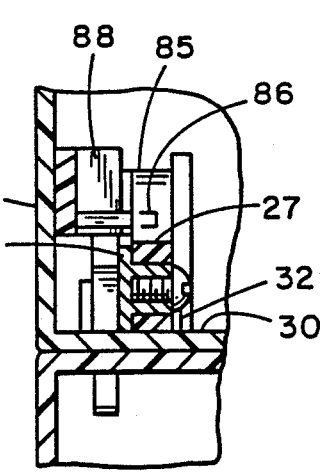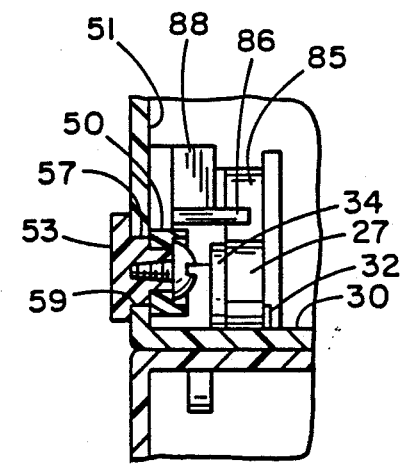
FIG. 6
FIG. 7
FIG. 8
FIG. 9

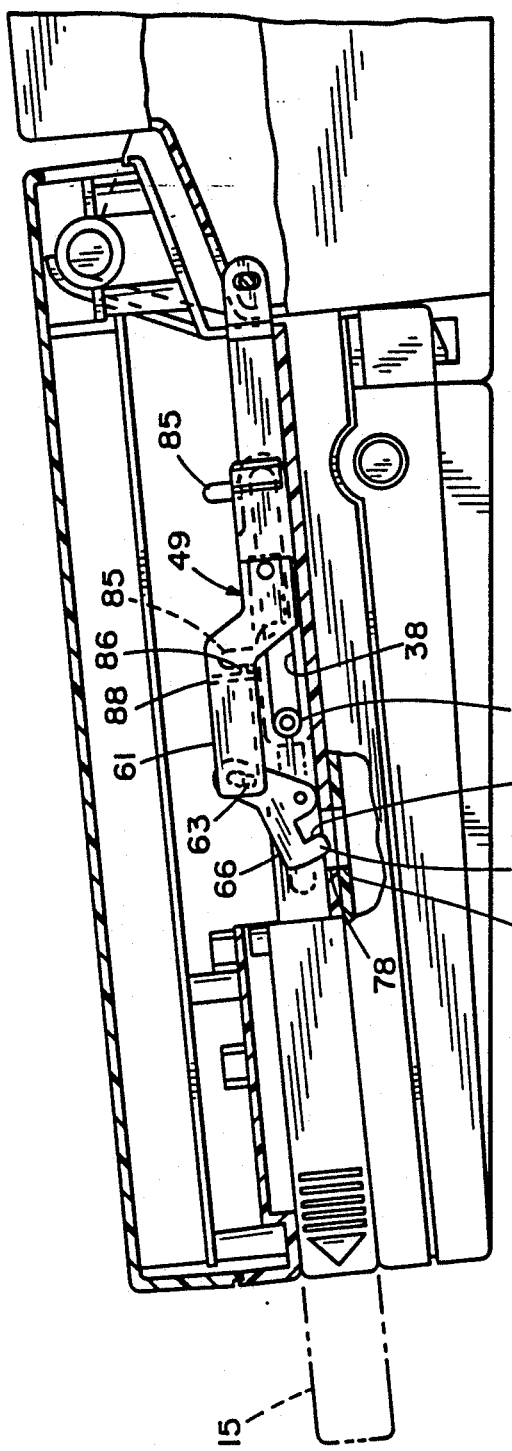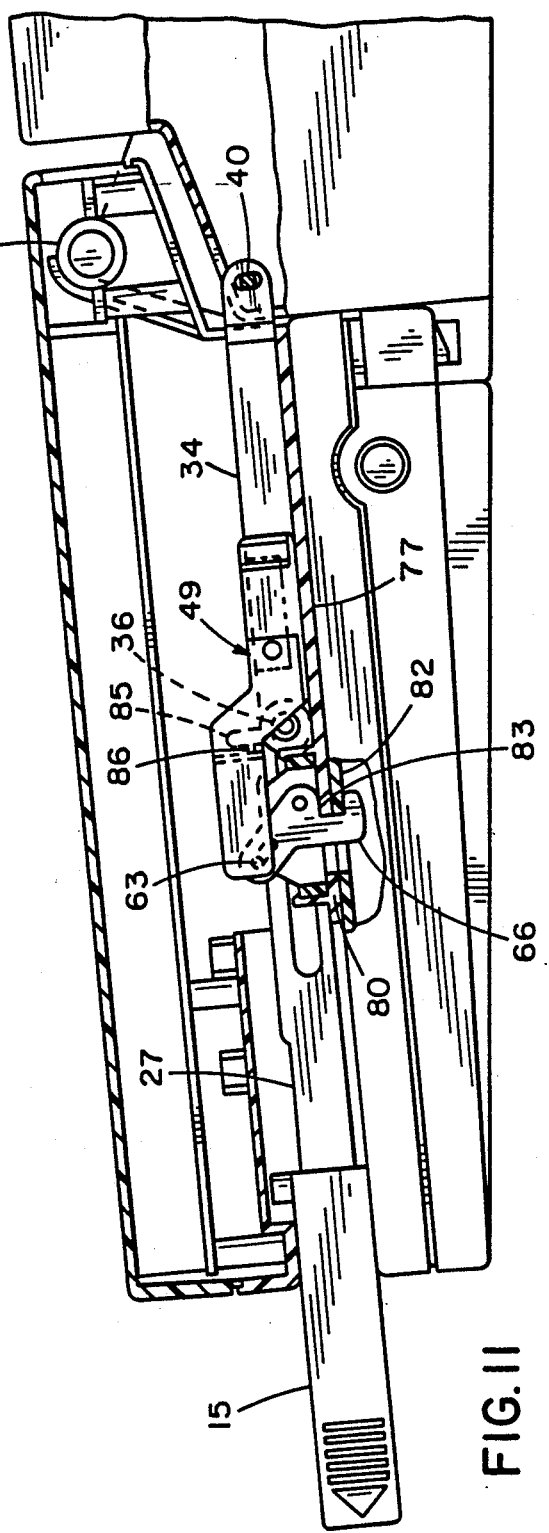
FIG. 10
FIG. 11

RETRACTABLE HANDLE AND LATCH FOR PORTABLE COMPUTERS

BACKGROUND OF THE INVENTION AND PRIOR ART

Over recent years there has been widespread development of personal computers, and the industry has experienced a rather dramatic increase in the design, development and sale of computers which are portable. These portable computers are not significantly larger than small portable typewriters, and contain their own built-in central processing unit, memory, disk drives, keyboard, display and carrying handle. The display is typically a liquid crystal display contained on one side of a panel or lid which folds down flat on the upper surface of the keyboard to serve as a cover to protect the keyboard and display during storage and travel.

It is desirable that the display panel, including the hinging hardware, fold flush with the upper surface of the keyboard and this is usually accomplished by accommodating the display panel with a recess into which the upper surface of the keyboard fits.

It is essential that the display panel be securely locked to the keyboard for transportation. It is also desirable that the locking or latching device be substantially flush with the sides of the computer to eliminate any unwanted protrusions that not only interfere with ease of portability but also detract from the aesthetics of the computer. Prior attempts to reach these objectives have produced partly satisfactory latches but they are somewhat prone to inadvertent release because the locking action is not completely positive. For example, in the Paulson, et al., U.S. Pat. No. 4,571,456, a locking mechanism is illustrated between the lid assembly and the keyboard that includes a linearly reciprocal hook-like lug in the lid and a cooperating undercut recess on the keyboard. The engaging faces on the hook lug and undercut recess are complementary but angled and thus tend to cam the lug out of the recess.

For ease of portability, it is also desirable to provide the portable computer with a handle assembly that is retractable so that when not in use can be retracted to improve overall aesthetics in the office environment. Prior attempts at retractable handle assemblies have resulted in handles which are difficult to extend and retract.

It is a primary object of the present invention to ameliorate the problems noted above in latching and retractable handle assemblies for portable computers.

SUMMARY OF THE PRESENT INVENTION

In accordance with the present invention, a portable computer is provided with a base, a keyboard and lid pivotally mounted to the base with a retractable handle and side-mounted positive lid latches that are functionally interrelated so that extension of the handle actuates the latches, and the handle is retracted automatically as the lid is unlocked and opened. The positively retracted handle prevents the user from picking the computer up by the handle with the lid open and imposing loads on the lid pivot mounting. When the lid is closed handle loads are transferred through the handle directly to the base and not through the lid. In this way the lid pivotal mounting does not have to be designed to carry the total computer weight. Eliminating the need for the operator to retract the handle is also important, not so much because manual handle retraction is difficult, but because the user will frequently simply neglect to retract the handle and the resulting protruding handle is prone to bumping adjacent obstacles and is aesthetically unpleasant in the work area.

The automatic actuation of the latch mechanisms upon handle extension with the lid assembly closed, preparatory to transport, in addition to expediting preparation of the computer for transport, also permits the handle to be used as a superior operator for the latch mechanisms which, as noted above, are flush to the sides of the computer and therefore somewhat difficult to engage.

Toward these ends, the present portable computer is provided with a pivotal lid assembly, housing an LCD display, that has linearly reciprocable latch operators on its sides and a channel-shaped peripheral recess that slidably receives a generally U-shaped retractable handle. The handle has spaced elongated arms with laterally projecting distal lugs that engage bars on the latch operators after the handle is partly extended to shift the latch operators to their engaged positions as the handle is fully extended. This permits the user to partly extend the handle assembly without resistance by light engagement of the hands on the sides of the handle, and then gain leverage by grasping the handle crossbar for complete extension and latch operation.

These handle arms are also provided with elongated slots that slidably receive a follower connected to one end of a pair of retraction links that are pivotally mounted at their opposite ends adjacent and below the pivotal axis of the lid assembly on the computer base. This geometry causes the retraction link followers to engage the ends of the handle arm slots as the lid is opened, withdrawing the handle smoothly to its fully retracted position as the retraction links pivot up to a position near the axis of the pivotal mounting of the lid assembly. When the lid is closed and the handle extended, these retraction links also transfer all the handle load directly to the base without loading the lid pivotal mounting.

The positive locking action of the latch mechanisms is achieved with a pivotally mounted locking pawl that has an elongated slot slidably receiving an actuating pin carried by one end of the linearly reciprocal latch operators. This locking pawl has a generally rectangular recess therein that forms a flat, parallel sided hook. The inner surface of a lid panel is flat and parallel to an inner surface of a keyboard panel, and both are fully engaged and clamped by the pawl hook sides in the engaged position, thereby providing a strictly positive locking action not provided in protable computer lid assembly latching mechanisms heretofore provided.

Other objects and advantages of the present invention will appear from the following detailed description.

BRIEF DESCRIPTION OF THE DRAWINGS

FIG. 6 is a fragmentary exploded perspective view of the right handle arm and latch mechanism;

FIG. 7 is a fragmentary cross-section taken generally along line 7—7 of FIG. 5 illustrating the latch and handle retract mechanism;

FIG. 8 is a fragmentary cross-section taken generally along line 8—8 of FIG. 5 illustrating the right latch and handle retract mechanism;

FIG. 9 is a fragmentary cross-section taken generally along line 9—9 of FIG. 5 illustrating the right latch and handle retract mechanism;

FIG. 10 is a partly fragmented right side view of the present portable computer, prior to handle extension;

FIG. 11 is a partly fragmented right side view of the present portable computer after complete handle extension;

DETAILED DESCRIPTION OF THE PREFERRED EMBODIMENT

Figure 1:
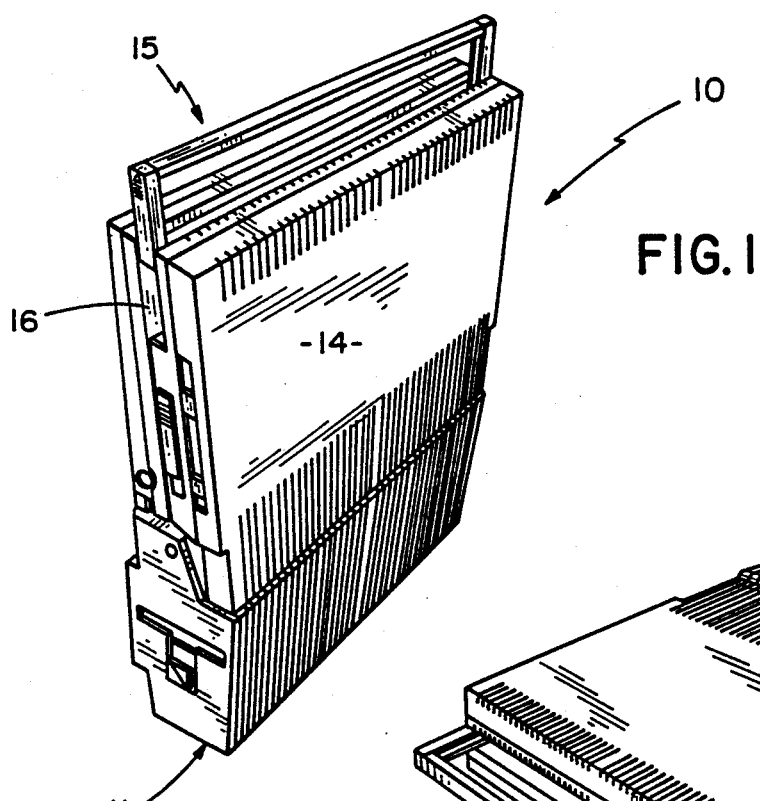
FIG. 1 is a perspective view of the present portable computer resting in a vertical closed position with its handle extended.
Figure 2:
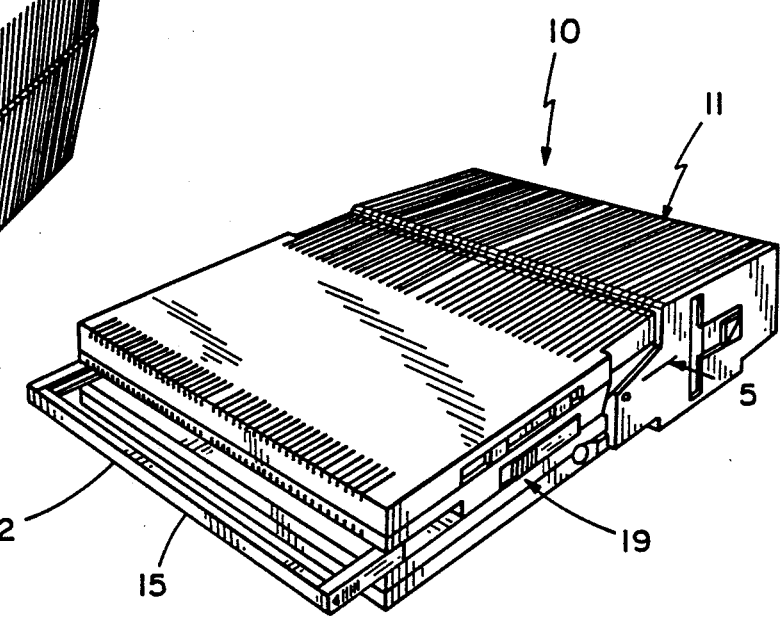
FIG. 2 is a perspective view of the portable computer illustrated in FIG. 1 in a horizontal closed position.
Figure 3:
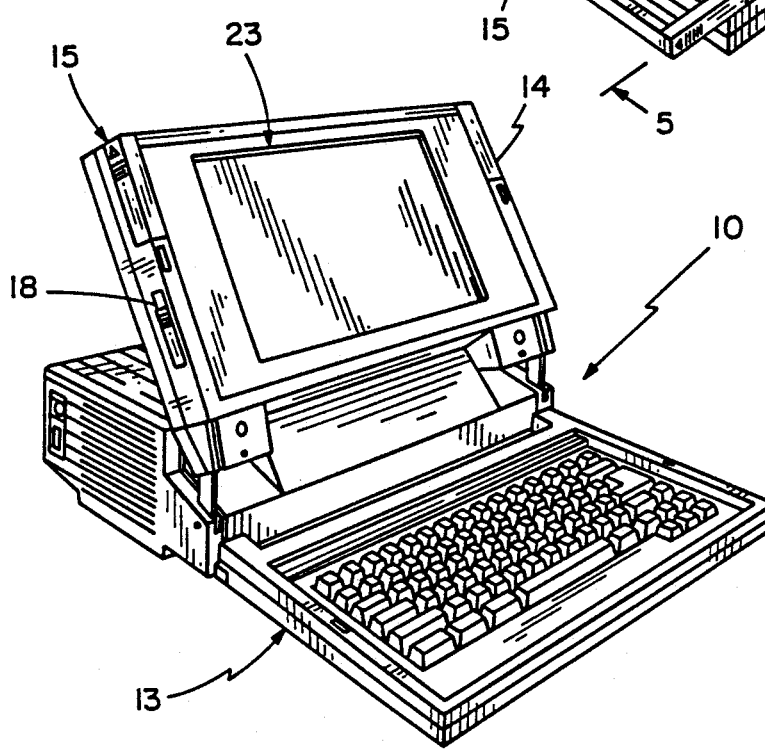
FIG. 3 is a perspective view of the portable computer illustrated in FIGS. 1 and 2 with its lid assembly open.

Referring to the drawings and particularly FIGS. 1 to 3, a portable computer 10 is illustrated according to the present invention and is seen to generally include a transversely elongated base 11, a keyboard assembly 13 and a lid assembly 14 pivotally mounted on base 11. A retractable handle assembly 15 is slidably mounted in a channel-shaped peripheral recess 16 in the lid assembly 14, and the lid assembly 14 is selectively locked over the keyboard assembly 13 by opposite latch assemblies 18 and 19 also mounted in the sides of the lid assembly 14.

The base 11 typically carries a central processing unit, memory circuitry, a hard drive, disk drives and a plurality of slots for additional optional components.

The keyboard assembly 13 includes a plurality of keys of manually accessing the central processing unit in the base 11. In addition to the handle assembly 15 and the latch assemblies 18 and 19, the pivotally mounted lid assembly 14 has a flat LCD screen assembly 23 mounted therein visible as seen in FIG. 3 when the lid is in its open position.

The handle assembly 15 includes a straight rectangular cross member 22 connected to a pair of mirror image arms 24 spaced to slidably fit in side recesses 25 that form a part of the channel-shaped recess 16 that slidably receives the handle assembly 15 and conceals it except for its outer surface which is flush in the retracted position shown in FIG. 3, for example.

The portions of the handle assembly 15 on the opposite sides of the lid assembly 14 and the latch assemblies 18 and 19 are mirror images of one another so the following description of the right side portions thereof should be understood to apply to both sides equally.

Figure 4:
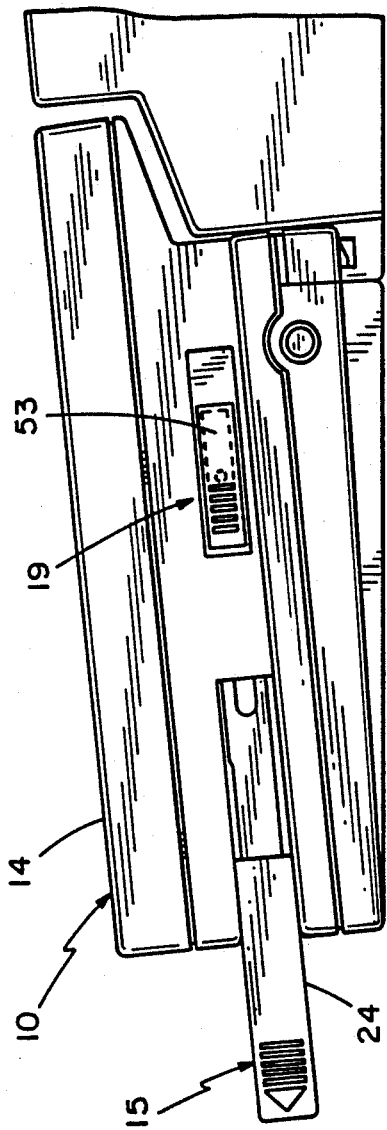
FIG. 4 is a right side view of the portable computer illustrated in FIGS. 1 to 3 with its handle extended and latches actuated.
Figure 5:
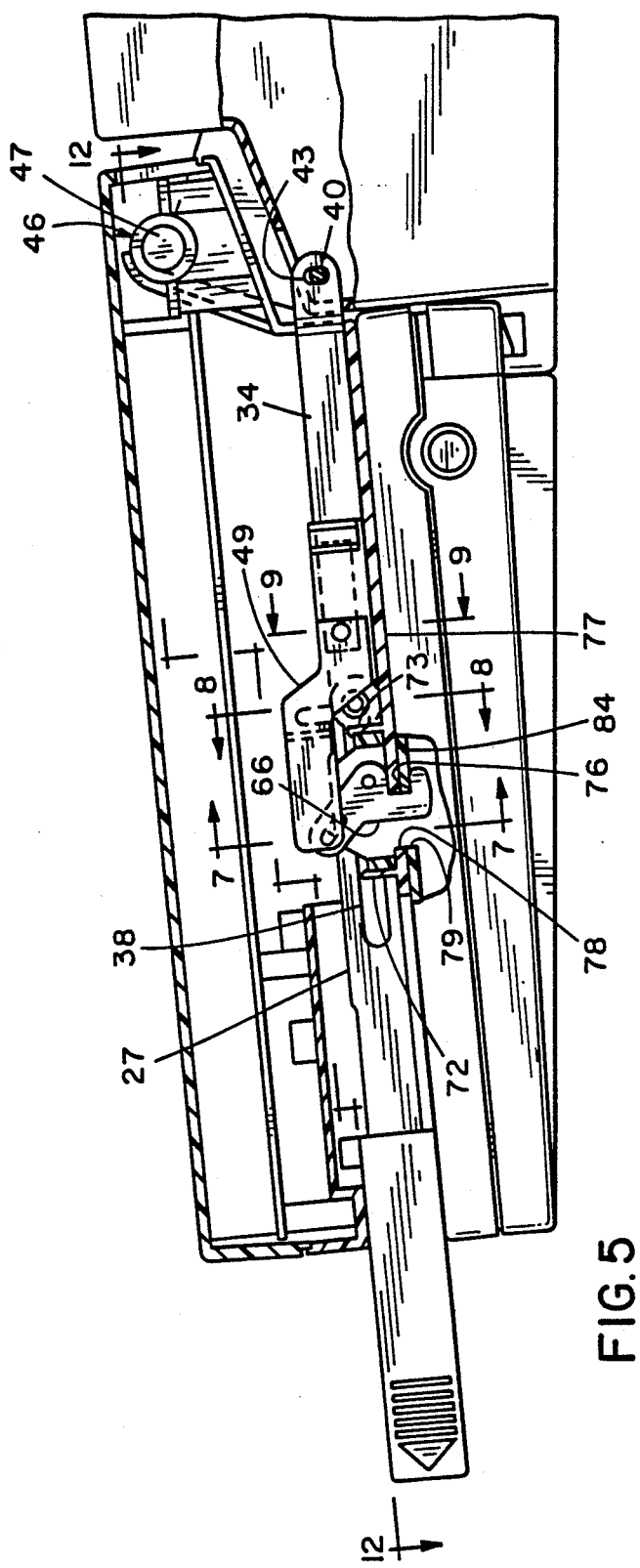
FIG. 5 is an enlarged partly fragmentary right side view of the present portable computer with its handle extended and latches locked.
Figure 12:
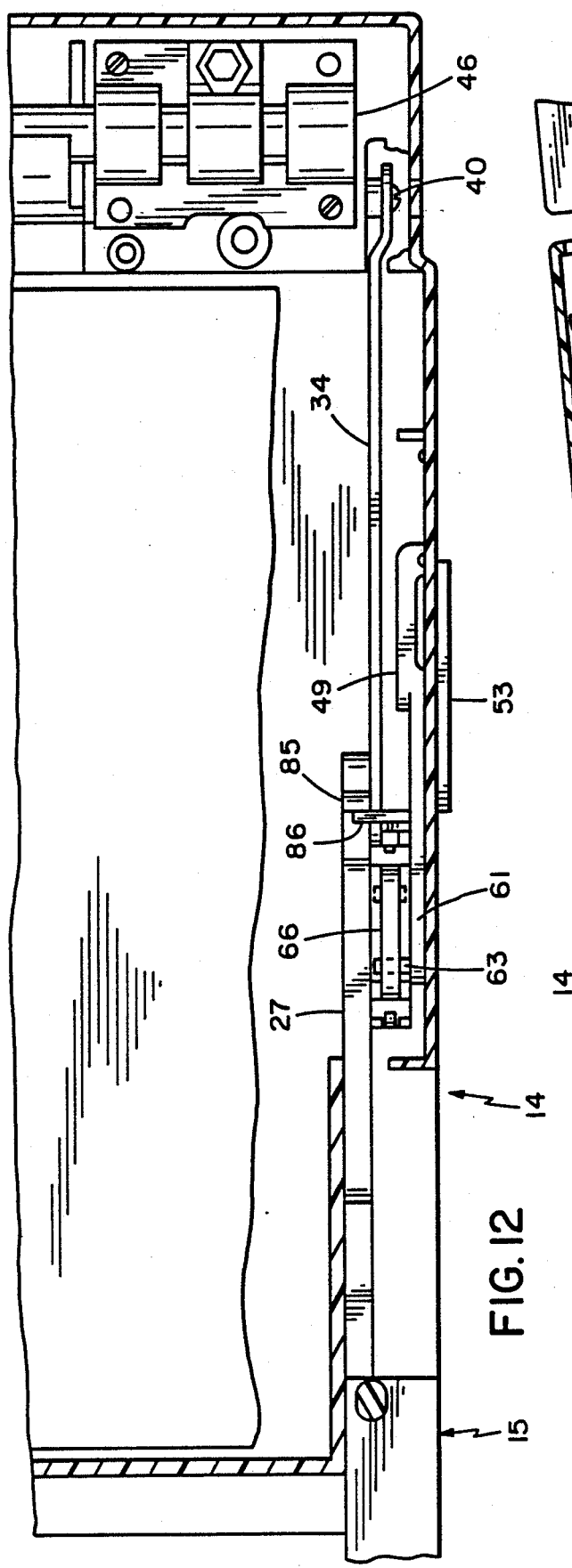
FIG. 12 is a fragmentary longitudinal section of the right side handle retract and latch mechanism with the handle extended taken generally along line 12—12 of FIG. 5.

Viewing FIGS. 4, 5 and 6, handle arm 24 has an integral elongated slide 27 extending outwardly therefrom that extends through an aperture 28 in the end of lid recess portion 25 and is slidable on inner lid panel surface 30 as seen in FIGS. 7, 8 and 9. Lateral movement of the slide 27 is minimized by an elongated integral rib 32 projecting upwardly from lid surface 30.

Figure 14:
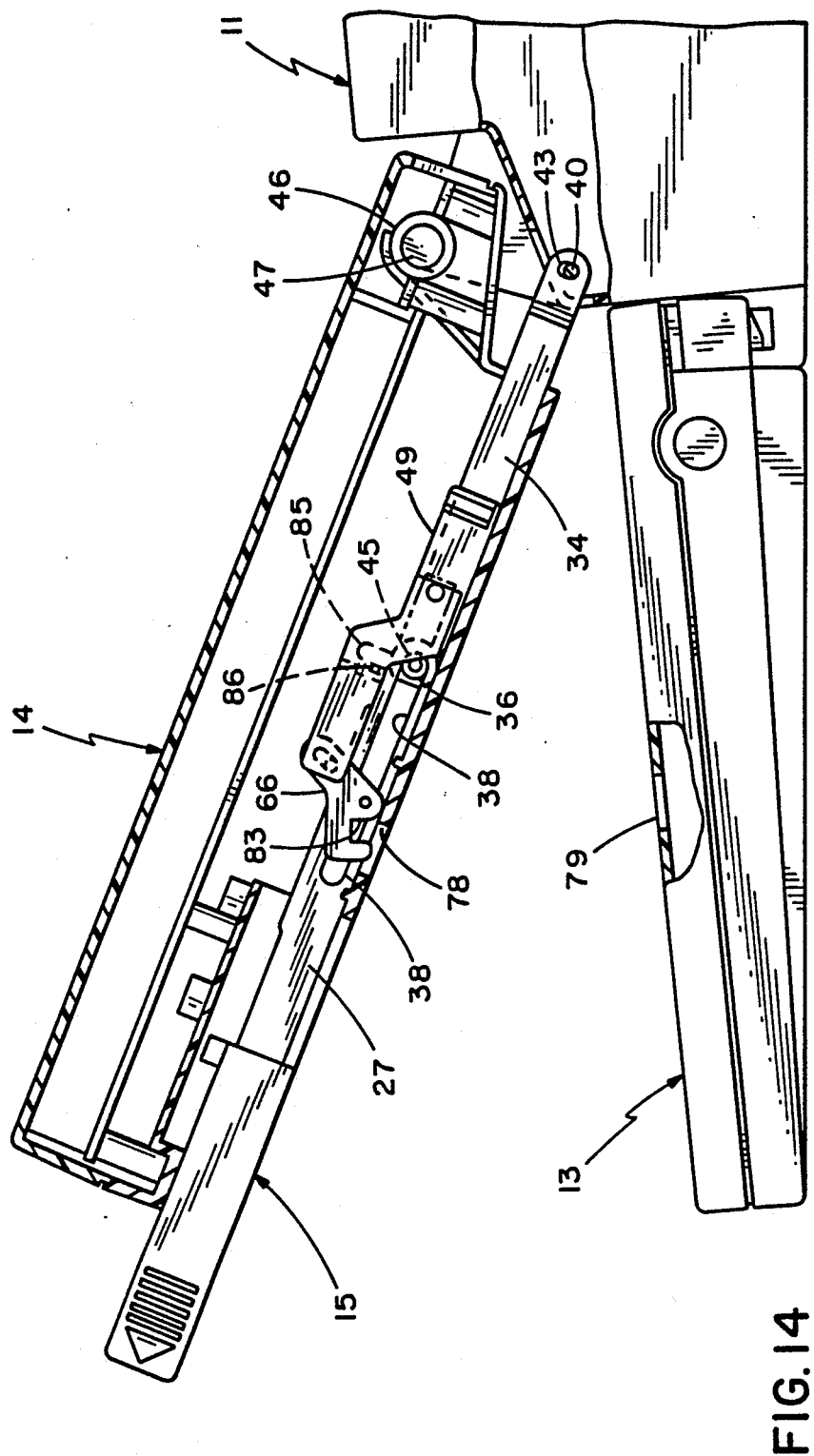
FIG. 14 is a partly fragmented right side view of the present portable computer with the lid assembly partly open.

An elongated, substantially straight retraction link 34 is mounted on the same lid panel surface 30 with its side slidably engaging the outboard side of slide 27, and it has a cylindrical follower 36 threadedly carried at its distal end slidable in an elongated slot 38 in slide 27. The proximal end of retraction link 34 is pivoted to base 11 by a fixed pin 40 carried in base slot 41, as seen in FIG. 6, which extends through a transversely slightly elongated aperture 43 in the proximal end of link 34. The location of slot 38 and the length of link 34 are selected so that follower 36 initially engages distal end 45 (FIG. 6) of slot 38 when the handle 15 is in a partly extended position with the lid partly open as illustrated in FIGS. 14.

The lid assembly 14 is pivotally mounted to the base 11 by a pair of pivot boss assemblies 46 having an axis 47. The retraction link pivot pin 40 has an axis offset forwardly from axis 47 approximately 0.25 inches and is below axis 47 approximately 1 5/16ths inches (in the horizontal position of the computer 10).

Figure 15:
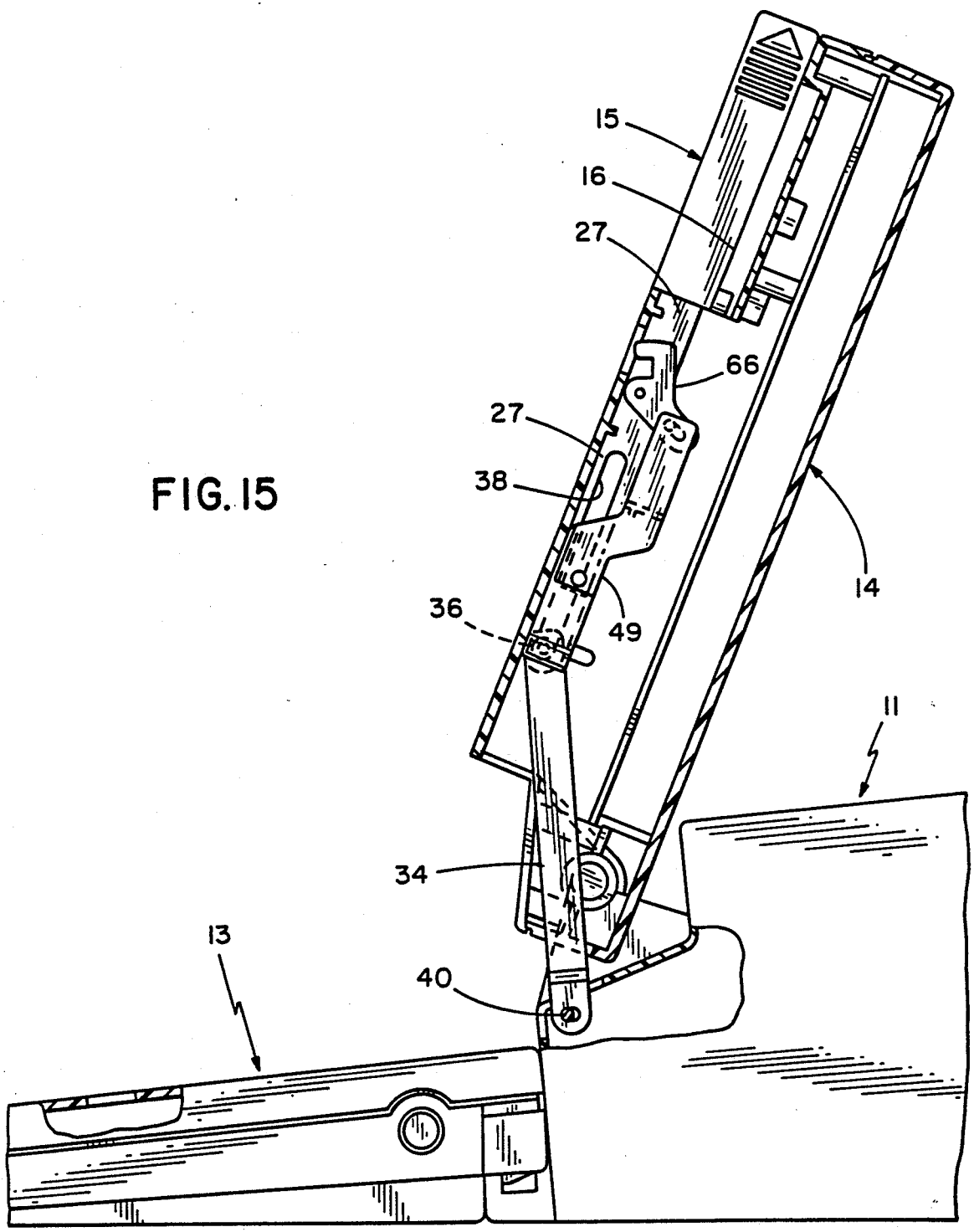
FIG. 15 is a partly fragmented right side view of the present portable computer with the lid assembly fully open.

The distance between lid pivot axis 47 and pivot pin 40 for the retracting links 34 is selected so that when the lid assembly 14 is pivoted to its fully open position illustrated in FIG. 15, links 34 will have dragged handle slides 27 sufficiently so that the handle cross member 22 is fully retracted into recess 16 and the handle 15 is flush with the ends and sides of the lid assembly 14.

The elongated slide slots 38 permits the handle assembly 15 to be retracted manually into recess 16 if desired when the lid 14 is closed.

Referring to FIGS. 4, 6, 7 and 8, the latch assemblies 18 and 19 each include an operator 49 having an integral support portion 50 with its outer surface slidably mounted on the inner surface 51 of the lid side panel 52, and it is held against the panel by an external manual slide 53, slidably mounted in a rectangular recess 55 in the lid panel 52, with a reduced integral projection 57 slidably guided in rectangular side panel aperture 59 as seen clearly in FIGS. 6 and 9.

The latch operator 49 has a laterally offset but parallel operator portion 61 seen clearly in FIGS. 6 and 7 that has a pin 63 slidable in elongated slot 64 in a locking pawl 66 pivotally mounted by pin 68 in an elongated rectangular bifurcated mounting frame 70 which is, in turn, mounted with its lower surface against lid surface 30 abutting panel surface 51 as seen in FIG. 7 and held laterally by surface 51 and slide 27 and longitudinally by a pair of integral projections 72 and 73 in lid panel surface 30, as seen clearly in FIG. 5.

The locking pawl 66, as seen in FIG. 5, has a generally rectangular recess 76 with parallel side surfaces 83 therein spaced just slightly greater than the thickness of the engaging lid panel 77 and keyboard panel 80 at the locking recesses 78 and 79 therein so that when engaged pawl 66 clamps the lid panel and the keyboard panel securely together.

With reference to FIGS. 10 and 11, as operator 49 is shifted from its passive position illustrated in FIG. 10 forwardly to its engaged position illustrated in FIG. 11, operator pin 63 pivots pawl 66 in a counter-clockwise direction so that tang 81 formed by recess 76 pivots down through latching apertures 78 and 79 engaging keyboard panel inner surface 82. In this locked position panel side surfaces 83 engage the inner surface 30 of the lid panel 77 securely clamping the lid panel to the keyboard panel.

The handle assembly 15 is constructed to shift the latch assemblies 18 and 19 to their closed or actuated position upon full extension of the handle 15 from the lid 14, and the latch assemblies 18 and 19 are designed to shift the handle assembly 15 to a partly retracted position as they are opened from a previously locked position.

Toward these ends the slides 27 are provided with a latch lug 85 that is positioned to selectively engage a transversely extending latch bar 86 integral with operator offset portion 61 immediately to the rear of flange 88. The latch bar 86 extends out sufficiently to interfere with the latching lug 85 so that as the handle 15 is extended the lug 85 moves to a position engaging latch bar 86 forcing the latch bar 86 and operator 49 forwardly causing latch actuation.

As seen in the fully retracted position of handle assembly 15 in FIG. 10, latch lug 85 is significantly to the rear of latch bar 86 so that handle assembly 15 must be pulled outwardly approximately to the halfway dotted line position illustrated in FIG. 10 where the lug 85 engages latch bar 86. This partial extension is virtually frictionless and enables the handle 15 to be extended sufficiently so that handle cross bar 22 can be easily grasped with one hand and pulled firmly outwardly causing lugs 85 to shift the latch operators 49 forwardly to the position illustrated in FIG. 11 fully engaging the latching pawls 66 locking lid assembly 14 to the keyboard 13.

With the lid assembly closed and the handle assembly 15 fully extended as seen in FIGS. 5 and 11, handle loads are transferred directly to the base through arms 27, followers 36, links 34 and pivot pin 40, without loading the lid pivot boss assemblies 46.

In the fully extended position of the handle assembly 15, as illustrated in FIG. 11, latching lug 85 is in engagement with latching bar 86. Therefore, as the user unlocks the lid 10 by shifting the manual slides 53 rearwardly, the latch bar 86 shifts the latching lug 85 rearwardly as the latch opens to the position illustrated in FIG. 10, retracting the handle 15 to the dotted line position illustrated in FIG. 10. Thus, the latch assemblies 18 and 19 partly retract the handle 15 as they are opened.

Figure 13:
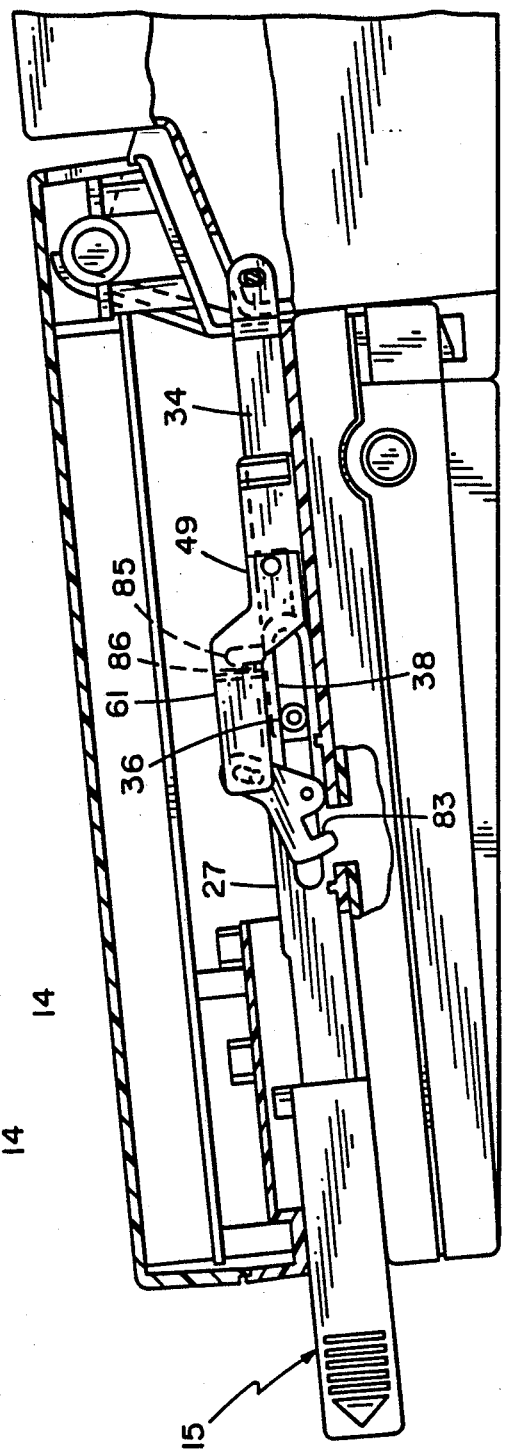
FIG. 13 is a partly fragmented right side view of the present portable computer with its handle partly extended.

Viewing FIG. 13, in this partly retracted position of the handle assembly 15 after the latch assemblies 18 and 19 have been manually opened, retract link follower 36 is slightly rearwardly from its mid position in elongated slide slot 38. Thus, as the lid assembly 14 is pivoted upwardly in an opening direction, follower 36 slides freely in slot 38 until the lid 14 reaches approximately a 30 degree position illustrated in FIG. 14 where follower 36 engages distal end 45 of the slot and begins withdrawing handle assembly 15 into lid recess 16. The distance between the lid pivot axis 47 and pin 40 is sufficient so that when the lid 14 reaches its fully open position illustrated in FIG. 15, handle assembly 15 will be fully retracted into the lid recess 16.

In summary, when the lid assembly 14 is closed with the latch assemblies 18 and 19 in their open positions, the user grasps the sides of the arms 24 pulling the handle assembly 15 partly outwardly to its dotted line position illustrated in FIG. 10. The user then manually grasps the handle cross bar 22 and completes handle extension which automatically actuates the latching assemblies 18 and 19 locking the lid 14 to the keyboard 13. The computer 10 is then in its closed and locked mode ready for transport with the handle 15 extended. Preparatory to work resumption, the user manually shifts the latch slides 53 rearwardly opening the latches 18 and 19 which simultaneously partly retracts the handle assembly 15 to the position illustrated in FIG. 13. Lid assembly 14 is then pivoted about pivot bosses 46 until it reaches its partly open position shown in FIG. 14 where the retraction links 34 begin retracting handle assembly 15 into lid recess 16, which is just completed as the lid assembly 14 reaches its fully open position shown in FIG. 15.

What is claimed is:

1. A portable computer, comprising: a base including at least one drive, a keyboard assembly projecting forwardly from the base, a lid assembly pivotally mounted on the computer and movable from a closed position over the keyboard assembly to an open position permitting viewing of a visual display, at least one latch assembly for locking the lid assembly in a closed position, a retractable handle assembly on the computer movable from a retracted position to an extended position, and means responsive to movement of the handle assembly toward its extended position for activating the latch assembly.

2. A portable computer as defined in claim 1, wherein said handle assembly and at least a portion of the latch assembly are movable linearly along adjacent parallel axes, said handle assembly having a lug selectively engageable with said linearly movable portion of the latch assembly for activation thereof.

3. A portable computer as defined in claim 1, said latch assembly including a pair of linearly reciprocable operators slidably mounted in the lid assembly, said handle assembly including spaced parallel support arms slidably mounted in the lid assembly adjacent the latch assembly operators, said latch assembly being actuable independently of the handle assembly.

4. A portable computer as defined in claim 1, said latch assembly including a pair of linearly reciprocable operators slidably mounted in the lid assembly, said handle assembly including spaced parallel support arms slidably mounted on the lid assembly adjacent the latch assembly operators, and an upwardly projecting lug on each of the handle arms selectively engageable with the latch operators for activating the latch assembly.

5. A portable computer as defined in claim 1, wherein the latch assembly includes a pair of linearly reciprocable operators slidably mounted on the lid assembly, said latch assembly also including a pair of pivotally mounted locking pawls in the lid assembly activated by the operators for engaging and gripping the keyboard assembly.

6. A portable computer as defined in claim 1, including means for automatically retracting the handle assembly in response to opening movement of the lid assembly.

7. A portable computer as defined in claim 6, wherein the means for automatically retracting the handle assembly includes a pair of arms in the handle assembly having elongated slots therein, and link means pivotally mounted on the computer adjacent but spaced from the pivotal mounting of the lid assembly thereon having follower means slidably mounted in the elongated slots.

8. A portable computer, comprising: a base including at least one drive, a keyboard assembly projecting forwardly from the base, a lid assembly pivotally mounted on the computer and movable from a closed position over the keyboard assembly to an open position permitting viewing of a visual display, at least one latch assembly for locking the lid assembly in a closed position including a pair of operators, a retractable handle assembly on the computer movable from a retracted position to an extended position including a pair of support arms, and an upwardly projecting lug on each of the handle arms selectively engageable with the latch operators for activating the latch assembly.

9. A portable computer, comprising: a base including at least one drive, a keyboard assembly projecting forwardly from the base, a lid assembly pivotally mounted on the computer and movable from a closed position over the keyboard assembly to an open position permitting viewing of a visual display, at least one latch assembly for locking the lid assembly in a closed position, a retractable handle assembly movable from a retracted position to an extended position, and means for automatically retracting the handle assembly in response to opening movement of the lid assembly.

10. A portable computer as defined in claim 9, wherein the means for automatically retracting the handle assembly includes a pair of arms in the handle assembly having elongated slots therein, and link means pivotally mounted on the computer adjacent but spaced from the pivotal mounting of the lid assembly thereon having follower means slidably mounted in the elongated slots.

11. A portable computer as defined in claim 10, wherein the link means is pivotally mounted to the computer below the pivot for the lid assembly on the computer with the computer horizontal.

12. A portable computer as defined in claim 9, including means responsive to movement of the handle assembly toward the extended position for activating the latch assembly.

13. A portable computer as defined in claim 12, wherein said handle assembly and at least a portion of the latch assembly are movable linearly along adjacent parallel axes, said handle assembly having a lug selectively engageable with said linearly movable portion of the latch assembly for activation thereof.

14. A portable computer as defined in claim 12, wherein the latch assembly includes a pair of linearly reciprocable operators slidably mounted on the lid assembly, said latch assembly also including a pair of pivotally mounted locking pawls in the lid assembly activated by the operators for engaging and gripping the keyboard assembly.

15. A portable computer, comprising: a base including at least one drive, a keyboard assembly projecting forwardly from the base, a lid assembly pivotally mounted on the base and movable from a closed position over the keyboard assembly to an open position permitting viewing of a visual display, at least one latch mechanism for locking the lid assembly in a closed position, a retractable handle movable from a retracted position to an extended position, means for automatically retracting the handle assembly in response to opening movement of the lid assembly, the means for automatically retracting the handle assembly having elongated slots therein, and link means pivotally mounted on the base adjacent but spaced from the pivotal mounting of the lid assembly thereon having follower means slidably mounted in the elongated slots.

16. A portable computer, comprising: a base including at least one drive, a keyboard assembly projecting forwardly from the base, a lid assembly pivotally mounted on the computer and movable from a closed position over the keyboard assembly to an open position permitting viewing of a visual display, said lid assembly and keyboard assembly having engaging panels in the closed position with aligned locking slots therein, at least one latch assembly for locking the lid assembly in a closed position including a linearly reciprocably mounted operator on one of the lid assembly and keyboard assembly, a pivotally mounted locking pawl on said one assembly having an elongated slot therein, said locking pawl being movable from a retracted position completely inside the one assembly to an extended position extending from the one assembly locking slot into the other assembly panel locking slot whereby the pawl is hidden in the retracted position, said operator having an actuator slidably mounted in the locking pawl slot, and undercut means in the other assembly panel for receiving the locking pawl.

17. A portable computer as defined in claim 16, wherein the locking pawl has a hook-shaped projection for engaging and locking on the undercut in the other assembly.

18. A portable computer, comprising: a base including at least one drive, a keyboard assembly projecting forwardly from the base, a lid assembly pivotally mounted on the base and movable from a closed position over the keyboard assembly to an open position permitting viewing of a visual display, latch assemblies for locking the lid assembly in a closed position including a pair of operators, a retractable handle assembly mounted on the computer movable from a retracted position to an extended position including a pair of elongated handle arms, an upwardly projecting lug on each of the handle arms selectively engageable with the latch operators for actuating the latch assemblies, means for automatically retracting the handle assembly in response to opening movement of the lid assembly including a pair of elongated slots in the handle arms, link means pivotally mounted on the base adjacent but spaced from the pivotal mounting of the lid assembly thereon having follower means slidably mounted in the elongated slots, said latch assemblies including a pair of pivotally mounted locking pawls having elongated slots therein, said operators having an actuator slidably mounted in the locking pawl slots, and undercut aperture means in the keyboard assembly for receiving the locking pawls, the locking pawls having a hook-shaped projection for engaging and locking in the undercut aperture means in the keyboard assembly.

19. A portable computer, comprising: a base including at least one drive, a keyboard assembly projecting forwardly from the base, a lid assembly pivotally mounted on the computer movable from a closed position over the keyboard assembly to an open position permitting viewing of a visual display, a retractable handle assembly on the computer movable from a retracted position to an extended position, and means interconnecting the handle assembly and base in the extended position to transfer substantially all the handle load directly to the base and not through the lid assembly pivotal mounting.

20. A portable computer as defined in claim 19, including retraction links for the handle assembly, said retraction links defining the means interconnecting the handle assembly and base when the handle assembly is extended.

21. A portable computer, comprising: a base including at least one drive, a keyboard assembly projecting forwardly from the base, a lid assembly pivotally mounted on the computer movable from a closed position over the keyboard assembly to an open position permitting viewing of a visual display, a retractable handle assembly on the computer movable from a retracted position to an extended position, and means for locking the handle assembly in its retracted position when the lid assembly is in its open position whereby the user is prevented from loading the lid assembly pivotal mounting by picking the computer up by the handle with the lid assembly open.

22. A portable computer as defined in claim 21, including means for automatically retracting the handle assembly as the lid assembly is opened.

* * * * *